W. BURDICK.
VEGETABLE TOPPING MACHINE.
APPLICATION FILED AUG. 26, 1908.

920,426.

Patented May 4, 1909.
3 SHEETS—SHEET 1.

Witnesses
L. B. James
M. S. Miller

Inventor
Will Burdick

W. BURDICK.
VEGETABLE TOPPING MACHINE.
APPLICATION FILED AUG. 26, 1908.
920,426.
Patented May 4, 1909.
3 SHEETS—SHEET 2.
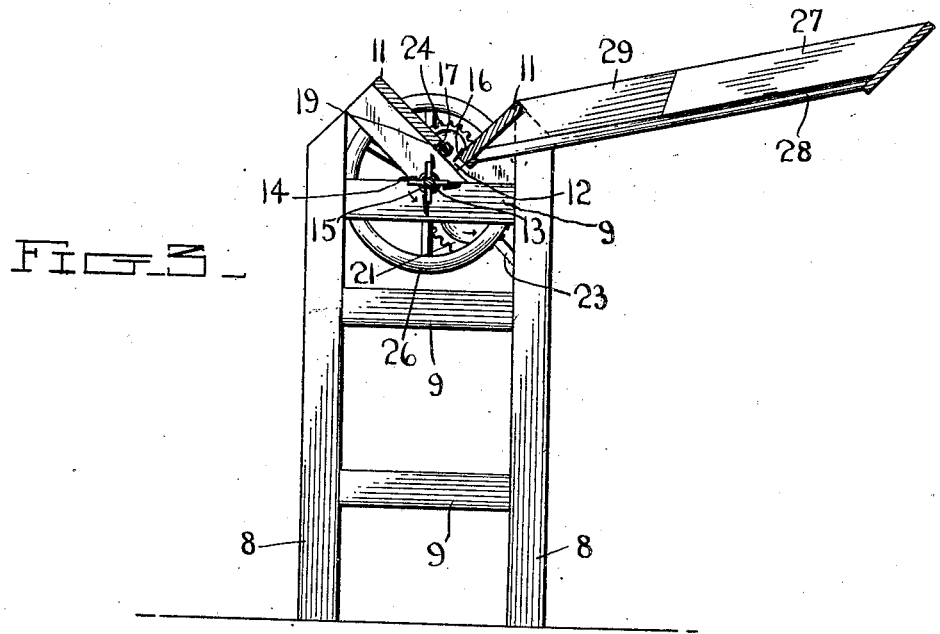
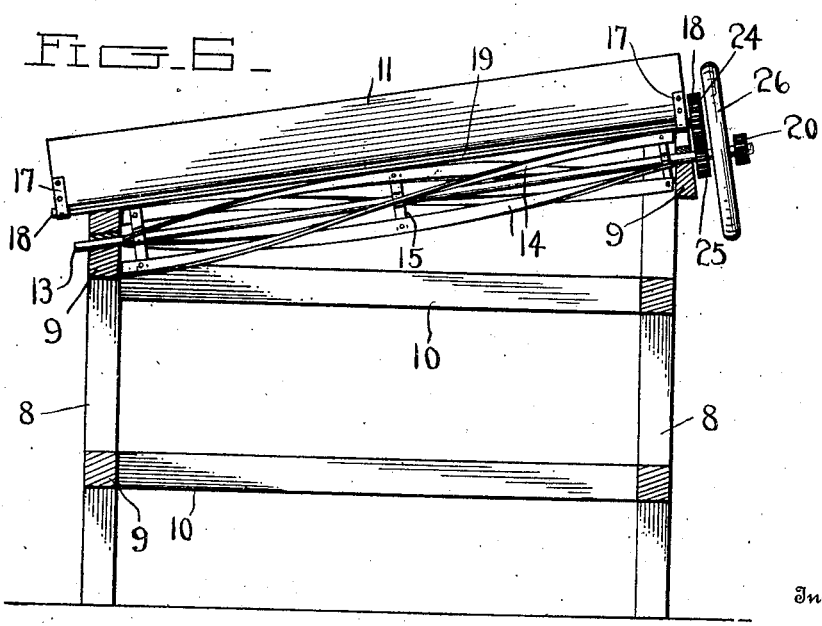
Witnesses
L. B. James
M. J. Miller
Inventor
Will Burdick
By
Attorneys

W. BURDICK.
VEGETABLE TOPPING MACHINE.
APPLICATION FILED AUG. 26, 1908.

920,426.

Patented May 4, 1909.
3 SHEETS—SHEET 3.

Witnesses
L. B. James
M. J. Miller

Inventor
Will Burdick

Attorneys

UNITED STATES PATENT OFFICE.

WILL BURDICK, OF MADISON, OHIO.

VEGETABLE-TOPPING MACHINE.

No. 920,426.  Specification of Letters Patent.  Patented May 4, 1909.

Application filed August 26, 1908. Serial No. 450,324.

*To all whom it may concern:*

Be it known that I, WILL BURDICK, a citizen of the United States, residing at Madison, in the county of Lake, State of Ohio, have invented certain new and useful Improvements in Vegetable-Topping Machines; and I do hereby declare the following to be a full, clear, and exact description of the invention, such as will enable others skilled in the art to which it appertains to make and use the same.

The invention relates to vegetable topping machines and more particularly to machines for cutting the tops from onions.
The primary object of the invention is the provision of a vegetable topping machine comprising a rotary cutter arranged immediately below an inclined trough receiving vegetables to be topped, means intersecting said trough to supply vegetables to the latter, and means for turning the vegetables in said trough to properly present the tops thereof to the cutter whereby said tops will be severed from the vegetables by the said cutter.
Another object of the invention is the provision of a machine for severing tops from vegetables such as onions which comprises a feed tray, chute or receptacle having an opened bottom adjacent and immediately below the same is mounted a rotary cutter, and in proximity to the said rotary cutter is a rotatable shaft to turn and properly position the vegetables so that their tops will be acted upon by the cutter to sever the same and means for simultaneously operating the cutter and turning shaft.

Figure 1:
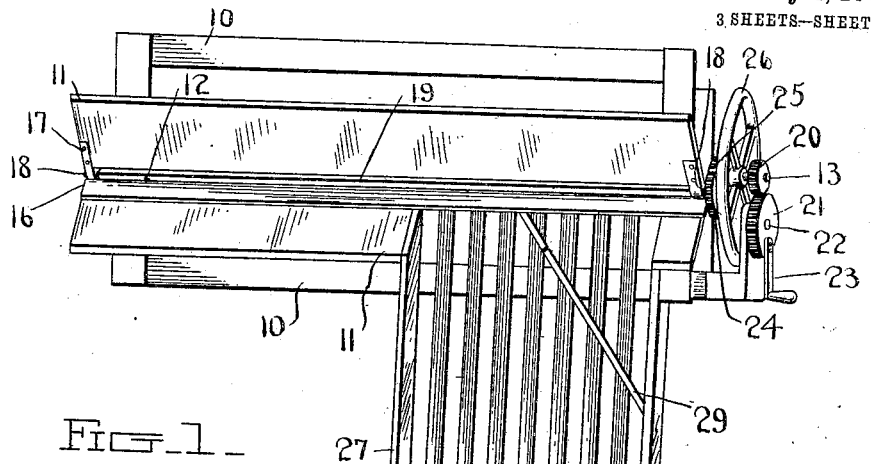
Figure 2:
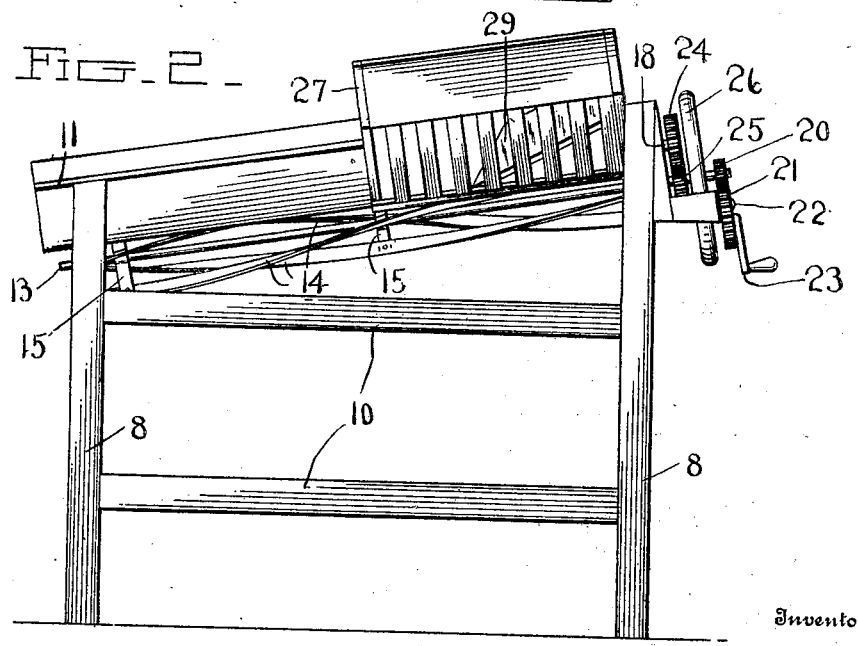
Figure 4:
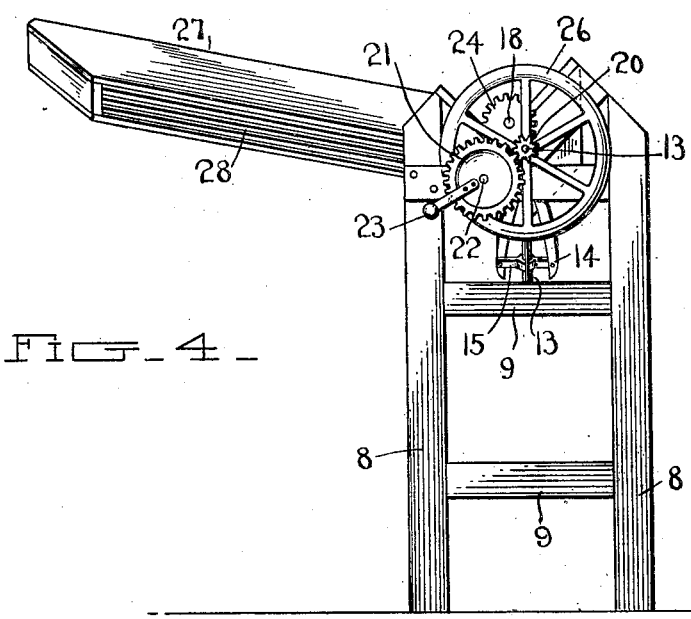
Figure 5:
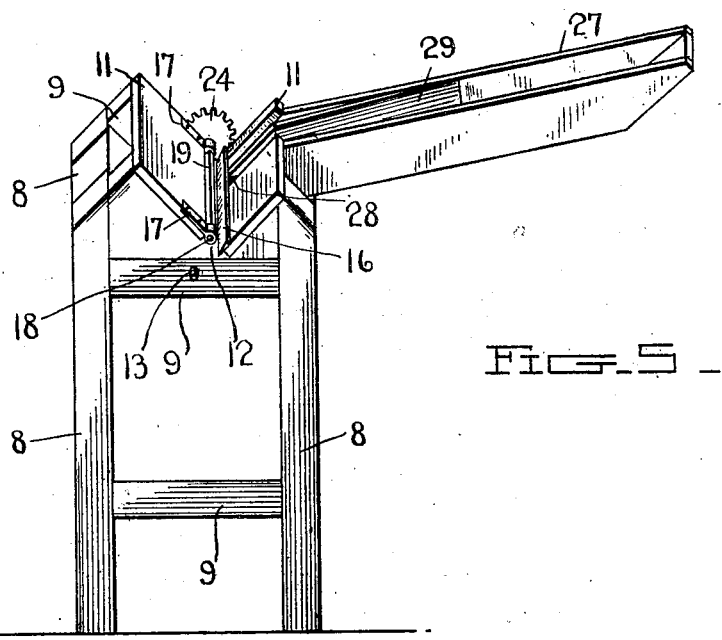

In the drawings accompanying and forming part of this specification is illustrated one form of embodiment of the invention which to enable those skilled in the art to carry the invention into practice will be set forth at length in the succeeding description while the novelty of the invention will be included in the claim hereunto appended.
In the drawings: Figure 1 is a top plan view of the invention. Fig. 2 is a side elevation. Fig. 3 is a vertical transverse sectional view. Fig. 4 is a view looking toward one end of the machine. Fig. 5 is a similar view looking toward the other end. Fig. 6 is a longitudinal sectional view through the machine.

Similar reference characters indicate corresponding parts throughout the several views in the drawings.

In the drawings the machine comprises a rectangular shaped frame structure having supporting legs 8 connected at their upper ends by cross pieces 9 and united by brace bars or beams 10 and which frame structure is inclined by making the legs at one end shorter than the legs at the opposite end. To the cross pieces 9 are connected inwardly converging side pieces or sections 11 to form a feed trough longitudinally disposed on the frame structure. The lower converging edges of the side pieces are separated a suitable distance from each other to form an open space 12 throughout the extent of the said trough.

Journaled in the cross pieces 9 is a rotary shaft 13 the same being arranged immediately below the opening 12 of the trough and carries a cutter member comprising a plurality of spiral blades 14 the latter being mounted upon spider arms 15 carried upon the said rotary shaft and which blades extend throughout the length of the opening 12 formed by the spaced side pieces 11 producing the trough and are adapted to move across the outer face of a stationary cutter blade 16 mounted upon the lower edge of one of the side pieces or sections 11 so as to produce a shear cut upon the rotation of the cutter member.

Secured to the lower edge of the side piece or section 11 opposite the one carrying the stationary cutter blade are mounted shaft bearings 17 in which is rotatably mounted a shaft 18 carrying a turning device such as a roller 19 of squared formation in cross section. The said rotary shaft 13 has at one free end a pinion 20 in mesh with a driving gear 21 the latter being mounted on a stud shaft 22 and carrying a hand crank 23, however this driving gear can be actuated in any other suitable manner.

On the shaft 18 at one end thereof is fixed a gear 24 the latter in mesh with a gear 25 fixed to the rotary shaft 13 whereby motion from the latter is imparted to the turning device. Also on said rotary shaft 13 is a balance or fly wheel 26.

Intersecting the feed trough is an inclined hopper or chute 27 the latter having a slatted bottom 28 and is adapted to receive the vegetables to be topped and to supply the same to the feed trough to be acted upon by the cutter member. Within the said hopper or chute 27 is a deflector plate or board 29 so as to direct the supply of vegetables from the said chute to the feed trough at a central point thereof. The tops after they are cut off from the vegetables drop to the ground or into a suitable receptacle placed under the mechanism.

What is claimed is—

In a machine of the class described, a frame, an inclined trough supported by said frame and having a gap throughout the longitudinal extent of the said trough, a turning roller of square shape in cross section arranged adjacent one edge of the gap and journaled on the trough, a stationary cutting blade projecting a slight distance beyond the opposite edge of said gap, a spiral bladed rotary cutter journaled in the frame directly below the gap and coextensive with the latter, gear mechanism actuating the turning roller and cutter in unison, and a feed hopper in communication with the trough and having a deflector board directing material toward the delivery end of said trough.

In testimony whereof, I affix my signature, in presence of two witnesses.

WILL BURDICK.

Witnesses:
 NELLIE M. CORLETT,
 W. A. CORLETT.